(No Model.)
T. B. JEFFERY.
VEHICLE LANTERN.
No. 454,171. Patented June 16, 1891.
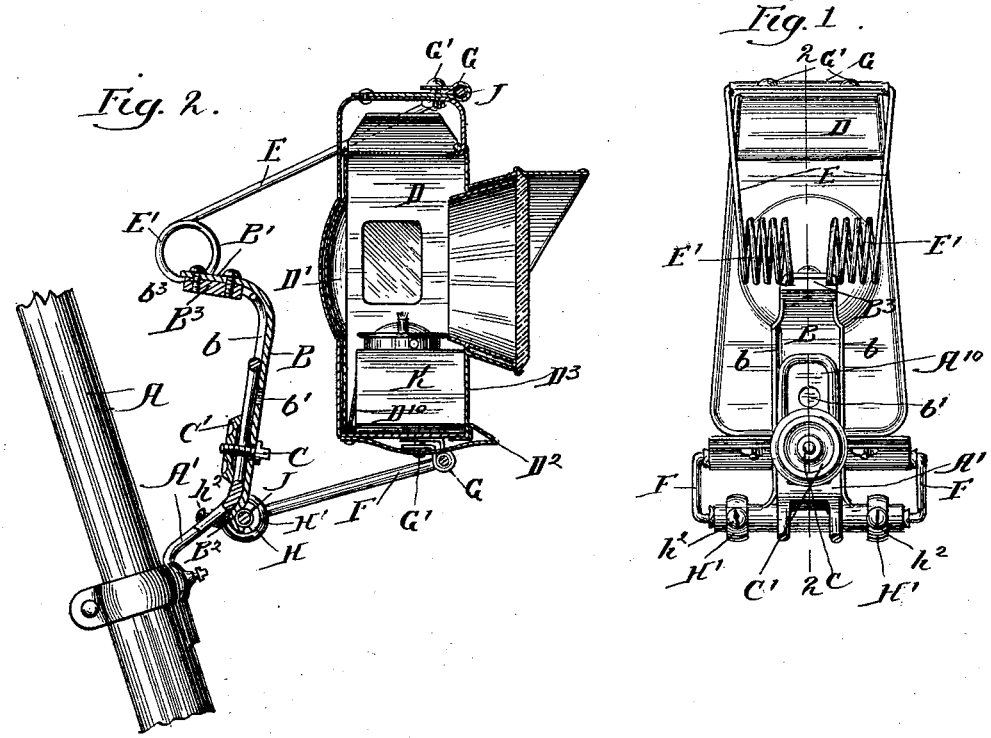
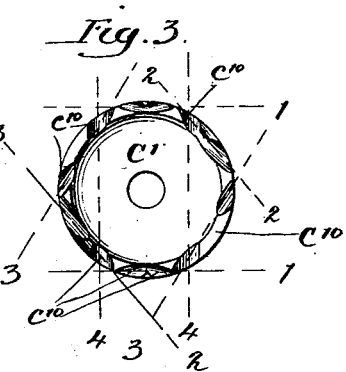
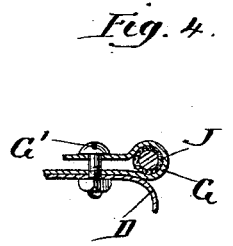
Witnesses:
H. B. Hallock.
Jean Elliott.
Inventor:
Thos. B. Jeffery
By Burton and Burton
Attorneys.
THE NORRIS PETERS CO., PHOTO-LITHO., WASHINGTON, D. C.

UNITED STATES PATENT OFFICE.

THOMAS B. JEFFERY, OF CHICAGO, ILLINOIS.

VEHICLE-LANTERN.

SPECIFICATION forming part of Letters Patent No. 454,171, dated June 16, 1891.

Application filed February 5, 1890. Serial No. 339,222. (No model.)

*To all whom it may concern:*

Be it known that I, THOMAS B. JEFFERY, a citizen of the United States, residing at Chicago, county of Cook, and State of Illinois, have invented certain new and useful Improvements in Vehicle-Lanterns, which are fully set forth in the following specification, reference being had to the accompanying drawings, forming a part thereof.

Figure 1 is a rear elevation. Fig. 2 is a section at the line 2 2 on Fig. 1, showing also in side elevation the arm of the vehicle to which the lantern is to be attached. Fig. 3 is a face view of the clamping-washer employed in fastening the lantern-support to the bracket provided for it on the vehicle. Fig. 4 is a detail section of the clamp-bearing by which the lantern-supporting links are pivoted thereto.

This lantern is especially designed for application to velocipedes and other vehicles of that general style; but it is applicable to other vehicles. Its peculiar features are such as adapt it for service in positions where jolting tends to extinguish the light, being designed to diminish the abruptness of the jolting movement and to secure fixedness of the lamp in the lantern.

A represents the arm of the vehicle to which the lantern is attached.

A' is a bracket thereon, affording the immediate means of attachment.

B is the lantern-supporting bar, having its principal arm vertical and having the horizontally-extended arm B' at the upper end, which affords convenient means for fastening one of the lantern-supporting links.

The bar B is provided with flanges $b$ at its lateral edges, forming between them a flat cavity on the back side of the support, which receives the bracket A', forming a seat for it when the support is clamped to the bracket. This bracket is of any convenient form at its lower part, where it is attached to the vehicle, its upper part consisting of an elongated eye or loop $A^{10}$, which is of such dimensions as to lie between the flanges $b$ of the lantern-supporting bar B. Said lantern-supporting bar has one or more—as illustrated, two—holes $b'$ through its vertical portion to admit the clamping-bolt C, the distance between said holes being something less than the length of the elongated eye of the loop $A^{10}$. A clamping-nut C' is adapted to be placed behind the loop and be clamped against it by tightening up the nut C, whose head is located at the forward side of the bar B. The length of the eye in the loop $A^{10}$ permits vertical adjustment of the bar on the bracket to that extent without changing the bolt from one hole to the other. An additional adjustment to the extent of the distance between the two holes is obtained by changing the bolt from one hole to the other. This lantern-support being designed to be applied to vehicles which have already on them brackets, such as A', for the purpose of attaching a lantern, and the width of the loop $A^{10}$ on such brackets varying somewhat, so that a given loop might not fit snugly between the flanges $b$ of the bar B, but, being narrower than the distance between said flanges, might permit the lantern to swing sidewise, and so out of vertical line, to the extent of the play that would be obtained between the edges of the loop and the flanges $b$, I provide the nut C' upon the face, which is designed to be applied toward the loop, with a marginal flange $C^{10}$, which will contact the loop and constitute the means of binding it against the bar, and in said marginal flange I provide several pairs or sets of notches $c^{10}$, one pair (indicated by the dotted lines 1 on Fig. 3) being in position to afford lodgment for the two sides of the loop $A^{10}$ in case that loop is as large as can be received between the flanges $b$, another set of notches (indicated by the dotted line 2 on Fig. 3) being a little nearer together and adapted to afford lodgment for the sides of the loop if it is a little narrower than the widest which can be received between the flanges, another set of notches (indicated by the lines 3 on Fig. 3) being still closer together, and a fourth set (indicated by 4) being still more closely located, so that any loop, from the narrowest which could contain an eye large enough to receive the bolt C to the widest which can be received between the flanges $b$, may find on the face of the clamping-nut a seat wherein it will be received, which will prevent the lantern from swinging on the support.

D is the lantern; E, the lantern-spring, which is also one of the links connecting the lantern to its support B. F is the other link. As illustrated, the spring-link is the upper one. This, however, is not essential. Both the links E and F are connected to the lantern at the forward part in preference to the rear or back side. This enables me to use a longer link without setting the lantern farther forward, the entire depth of the lantern from front to rear being so much additional space available to add to the length of the link. This gives to the lantern an easier and less abrupt vibration under any jolting to which it is subjected. The links are pivoted to the lantern, and the link F is pivoted to the supporting-bar B in clamp-bearings at H—that is, in bearings whose parts are adapted to be clamped together upon the pivotal portion of the link, which is grasped in the bearing, so that but for the yielding bushings employed, as hereinafter described, the bearings might be made to grasp the links rigidly, so that all motion would be prevented. In these clamp-bearings I place the yielding bushings J, which may be made of felt or rubber or any substance which is somewhat yielding, and in practice I clamp the bearings tightly upon these bushings, so that the motion which is obtainable therein is dependent upon the yielding character of the bushing. This affords a perfectly noiseless bearing and one which permits sufficiently free action of the pivot within it for all purposes of the device. These bearings G G of the lantern I make, preferably, of sheet metal folded upon itself, forming an eye which constitutes the bearing, the lapping leaves of the folded metal being clamped together quite near the eye or bearing by clamp-bolts G' G'. The bearing at H is comprised of two parts, one the part H' and the other the half bearing or seat B², formed on the bar B, these two parts being clamped by the collar H' and grasping between them the yielding bushing and the pivotal portion of the link. The collar carries the clamping-screw $h^2$, by which the two parts of the box or bearing are clamped together upon the bushing and the pivot therein. The spring-link E is formed, preferably, of a single piece of wire, having its ends made fast to the lantern-supporting bar B, this being effected by means of the clamp-block B³ and the binding-screws $b^3$, which fasten it onto the under side of the horizontal portion, the ends of the spring-links E being clamped between said block and horizontal portions of the bearing B. Immediately adjacent to the point of fastening of the link thus to the lantern-supporting bar it is formed into helical coils E' E' about the same horizontal axis, and the wire running from the ends of these coils extends to the bearing G, passing by the two sides of the lantern to reach the forward edge of its upper end, so that the lantern as it vibrates vertically passes between the two side bars of the spring-link. Otherwise described, it may be said that the wire which forms the link is connected at its middle part in the clamp-bearing G at the forward part of the lantern, and from said bearing is bent rearward and formed into the coils E', from the ends of which the ends of the wire extend to the points of fastening on the bar B.

D' is a rear reflector contained in the lantern D, being made of polished metal suitably shaped. At its lower end it is provided with the lip $D^{10}$, bent upwardly and forwardly and adapted to bear against the rear side of the lamp K, which is contained in the lantern resting on its bottom. This lip $D^{10}$ constitutes a spring which reacts against the rear side of the lamp, and when the latter is inserted and pushed into place and locked therein by the spring-nose $D^2$, which engages in front of the pivoted front door $D^3$, said spring-lip $D^{10}$, reacting against the lantern, holds it snugly and firmly in position and prevents its rattling or being displaced by the jolting movement to which the lantern is subjected.

I claim—

1. In combination with the lantern and the lantern-supporting bar, the links which connect them at bottom and top of the lantern, the top link consisting of a single piece of wire journaled at the middle part across the top of the lantern and having its end bent rearward and extending and secured rigidly to the supporting-bar and each formed into a helical coil about the same horizontal axis adjacent to said bar between the point of fastening thereto and the straight portion which runs forward to the lantern, whereby said coils constitute elastic hinges, about which the arms integral therewith reaching forward to the lantern oscillate vertically.

2. In a lantern, the rear reflector having the lip $D^{10}$ turned up from its bottom edge, in combination with the lamp adapted to be inserted and retained against said lip, substantially as set forth.

3. In combination with the lantern-supporting bracket having the eye to receive the clamping-bolt, the lantern-supporting bar having the lateral flanges $b$, forming a cavity between them on its rear side, adapted to receive the bracket, the bolt C, inserted through the bar and through the eye of the bracket, and the clamping-nut C', into which said bolt is screwed, whereby the bracket is bound between the bar and the nut, substantially as set forth.

4. In combination, substantially as set forth, the bracket $A^{10}$, having the elongated eye, the bar B, having the bolt-hole, the bolt C, inserted through said hole and through the eye of the bracket, and the binding-nut having the marginal projections from its face, forming between them several pairs of parallel seats for the two side bars of the eye, whereby the nut is adapted to fit eyes of different sizes, substantially as set forth.

In testimony whereof I have hereunto set my hand, at Chicago, Illinois, in the presence of two witnesses, this 29th day of January, 1890.

THOS. B. JEFFERY.

Witnesses:
CHAS. S. BURTON,
JEAN ELLIOTT.